United States Patent
Miller

(10) Patent No.: US 7,338,272 B2
(45) Date of Patent: Mar. 4, 2008

(54) APPARATUS FOR BLOW MOLDING

(75) Inventor: Paul Alan Miller, Cement City, MI (US)

(73) Assignee: Uniloy Milacron Inc., Tecumseh, MI (US)

( * ) Notice: Subject to any disclaimer, the term of this patent is extended or adjusted under 35 U.S.C. 154(b) by 337 days.

(21) Appl. No.: 11/227,266

(22) Filed: Sep. 15, 2005

(65) Prior Publication Data

US 2007/0059396 A1   Mar. 15, 2007

(51) Int. Cl.
B29C 49/48 (2006.01)

(52) U.S. Cl. .................. 425/182; 425/195; 425/522

(58) Field of Classification Search ............. 425/182, 425/195, 522, 525, 541
See application file for complete search history.

(56) References Cited

U.S. PATENT DOCUMENTS

| 4,584,158 | A | 4/1986 | Nilsson et al. |
| 4,815,960 | A | 3/1989 | Rudolf |
| 5,411,699 | A | 5/1995 | Collette et al. |
| 5,968,560 | A | 10/1999 | Briere et al. |
| 6,277,321 | B1 | 8/2001 | Vailliencourt et al. |
| 6,428,302 | B1 * | 8/2002 | Tsau ........................ 425/195 |
| 7,258,538 | B2 * | 8/2007 | Miller ....................... 425/182 |

* cited by examiner

*Primary Examiner*—Robert B. Davis
(74) *Attorney, Agent, or Firm*—John W. Gregg

(57) ABSTRACT

A mold assembly for blow molding comprises first, second and third mating mold components, molding surfaces of each of the first and second mold components being open to a mating face of the mold component and defining a portion of the exterior of an article to be molded, molding surfaces of the third mold component defining a portion of a closed end of the article to be molded, the mold assembly accepting at least one height insert selected according to a desired longitudinal extension of the molded article, and indexable adjusting means for altering the position of the molding surfaces of the third mold component to accommodate the effective longitudinal extension of the article to be molded. A blow molding machine comprises a press mechanism for operating a mold assembly and a mold assembly according to the invention, each mold component being mounted to a movable member of the press.

16 Claims, 4 Drawing Sheets

APPARATUS FOR BLOW MOLDING

I. BACKGROUND OF THE INVENTION

1. Field of the Invention

This invention relates generally to blow molding. In particular, this invention relates to mold assemblies for blow molding.

2. Description of Related Art

Blow molding is a cyclic process wherein a parison of material in a moldable condition is centered on the parting plane of a mold assembly, the mold assembly is closed around the parison, the parison is expanded so the exterior of the parison abuts molding surfaces defined by the closed mold assembly, the blow molded article is conditioned to be sufficiently rigid to retain its size and shape while unsupported, the mold assembly is opened and the blow molded article is removed. In general, the moldable condition of the parison is achieved when the material of the parison is at an elevated temperature, and the rigid condition of the blow molded article is achieved when the temperature of the material has been reduced. A blow molding machine comprises a press for opening and closing the mold assembly and blowing means for introducing a pressurized fluid (typically air) to expand the parison in the mold assembly. One type of blow molding equipment produces blow molded containers from preformed parisons having a closed end and a so-called "neck finish", the parisons typically produced by injection molding away from the press and the blow molding thereof referred to as "two-stage" blow molding. Two stage blow molding machines typically include means for mechanically stretching the parison longitudinally during blow molding. Additionally, blow molding machines may comprise means for handling the molded article upon removal from the mold assembly, means for trimming waste from the molded article (single-stage machines only), and heat transfer devices to elevate the temperature of the parison to achieve the moldable condition and to reduce the temperature of the blow molded article to achieve the rigid condition.

Blow molding is commonly used for production of containers for transporting, storing and dispensing liquids wherein the blow molded article comprises a body portion and a mouth opening for filling the container and dispensing the contents therefrom. The neck finish of parisons for two-stage blow molding such containers comprises surface features such as a thread for engaging a separable closure. It is known to blow mold containers having bases formed with concave surfaces allowing the container to stand upright without other means of support. Mold assemblies for blow molding containers comprise mating mold components for forming the body portion and concave base of the container, the molding surfaces for the body portion being open to mating faces of first and second mold components and the molding surfaces for the base portion comprising a third mold component engaged by the first and second mold components. A blow molding machine press comprises movable members supporting the mold components to engage them for blow molding and to separate them for removing the molded articles. When engaged, the mating faces of the first and second mold components abut at a so-called parting plane and the third mold component seats against the first and second mold components. The third mold component closes the base opening of the first and second mold components and the base end of each container cavity defined by the first and second mold components. To remove blow molded articles, the third mold component is retracted to disengage the molding surfaces of the mold base component from the bases of the blow molded containers.

To accommodate containers having a range of volume compatible with a particular mold assembly, each of the first and second mold components advantageously comprises a replaceable height insert between the neck portion and base opening and defining the longitudinal extent of the article to be molded. The base mold component for blow molding containers with concave base portions is reciprocated between engaged and disengaged positions. Consequently, to adjust for the effective length of the first and second mold components, the third mold component likewise comprises an insert establishing the position of the molding surfaces of the base mold relative to the machine member supporting the third mold component. In known mold assemblies, disassembly of the third mold component is required to install or remove the insert, including removal of fasteners used to retain the insert in the base mold component. Hence, there is a continuing need for mold components comprising means for adjusting the position the molding surfaces without disassembly of the third mold component.

II. SUMMARY OF THE INVENTION

It is an object of the present invention to provide a mold assembly for blow molding comprising mating mold components having molding surfaces, the mold assembly accepting at least one height insert selected according to a desired longitudinal extension of the article to be molded, and indexable adjusting means for altering the position of the molding surfaces defining a portion of the closed end of the article to be molded to accommodate the effective longitudinal extension of the article to be molded.

It is a further object of the present invention to provide a blow molding machine comprising a press mechanism for operating a mold assembly mounted thereto, the mold assembly comprising mating mold components having molding surfaces, the mold assembly accepting at least one height insert selected according to a desired longitudinal extension of the article to be molded, and indexable adjusting means for altering the position of the molding surfaces defining a portion of the closed end of the article to be molded to accommodate the effective longitudinal extension of the article to be molded.

Further objects and advantages of the invention shall be made apparent from the accompanying drawings and the following description thereof In accordance with the aforesaid objects the present invention provides a mold assembly for blow molding comprising first, second and third mating mold components, each mating mold component being supported by a machine member, the machine members being operated to position the mold components in mating engagement for blow molding and to separate the mold components for removal of blow molded articles, the mating mold components comprising molding surfaces defining the exterior of an article to be molded from a tubular parison, the molding surfaces of the first and second mating mold components being open to mating faces thereof, the molding surfaces of the third mold component defining a portion of a closed end of an article to be molded, the mold assembly accepting at least one height insert selected according to a desired longitudinal extension of the article to be molded, and indexable adjusting means for altering the position of the molding surfaces of the third mold component relative to the associated machine member to accommodate the effective longitudinal extension of the article to be molded. A blow molding machine comprises a press mechanism for operating a mold assembly and a mold assembly according to the invention, each of the mold components of the mold assembly being mounted to a machine member for bringing the mold components into engagement for blow molding and for separating the mold components for removal of blow molded articles from the mold assembly.

III. BRIEF DESCRIPTION OF THE DRAWINGS

IV. DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1A:
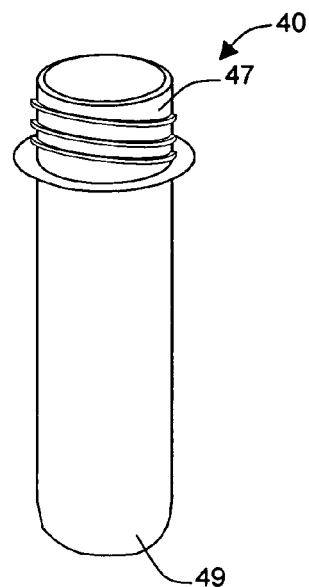
FIGS. 1a and 1b illustrate a preformed parison and finished container, respectively, of a two-stage blow molding process.
Figure 1B:
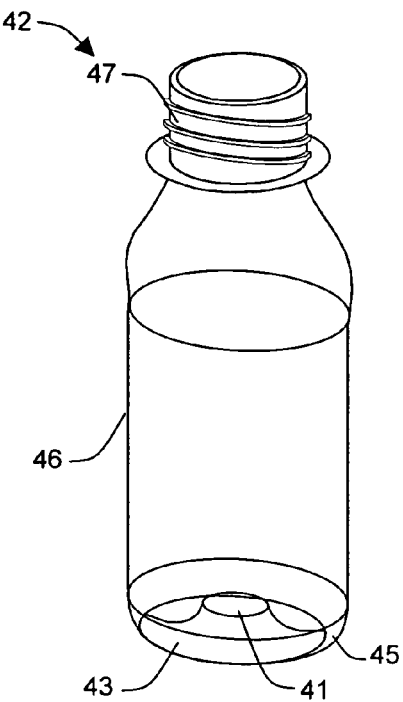

A two-stage blow molding process expands a preformed parison to produce a finished container. An exemplary parison 40 is shown in FIG. 1a as comprising a completed neck finish 47 and closed end 49. Preformed parison 40 is produced by injection molding, the wall thickness, diameter and length of parison 40 are chosen in accordance with properties of the material from which it is produced and the extent of expansion to be effected both axially and radially during blow molding. A container 42 blow molded from parison 40 is shown in FIG. 1b as comprising neck finish 47, body 46 and base 43. Base 43 comprises concave center 41 and surrounding annular base ring 45 which supports container 42 in an upright position. In preparation for blow molding, the material of preformed parison 40 is conditioned (heated) to be made deformable. A mold assembly comprising first and second mold components comprising molding surfaces defining the exterior of body 46 of container 42 and a third component comprising molding surfaces defining base 43 is closed around the conditioned, preformed parison and blow molding commences with closure of the mold assembly. During blow molding, pressurization is advantageously accompanied by mechanical stretching along the longitudinal length of preformed parison 40 to produce container 42. Following expansion, the material of container 42 is conditioned (cooled) to become sufficiently rigid for removal from the mold assembly and the mold components are separated from the container.

Figure 2:
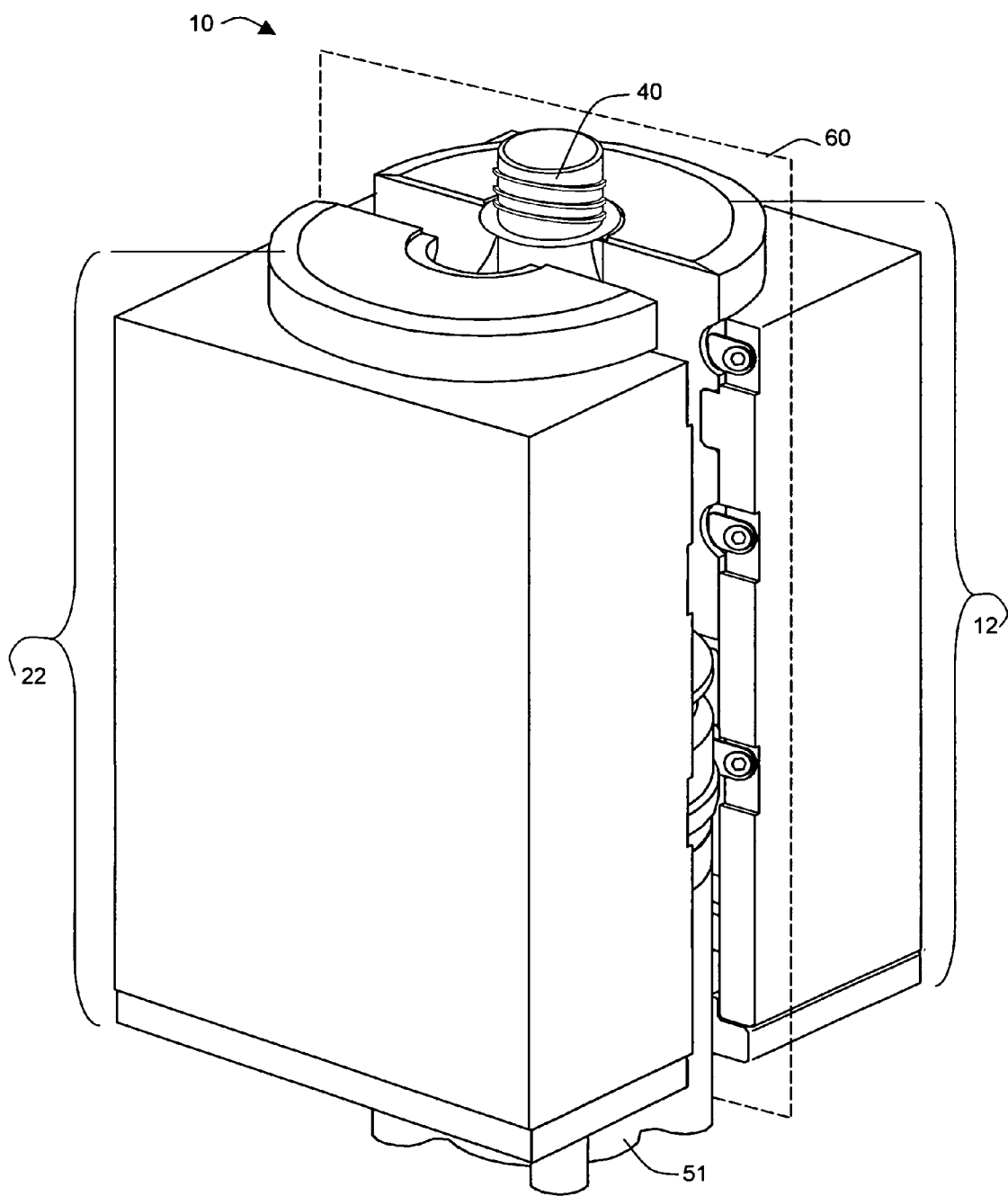
FIG. 2 is a three dimensional view of a mold assembly according to the invention.

Referring to FIG. 2, mold assembly 10 comprises first and second mating mold components 12 and 22 each referred to herein as a "mold half", and third mold component 50 referred to herein as the base mold. Each of mold components 12, 22 and 50 is carried by a member of a molding machine press (not shown) for translating the mold components between open and closed positions relative to each other (the relative position depicted in FIG. 2 is between the fully open and fully closed positions). In the open position, mold components 12, 22 and 50 are separated permitting removal of a molded article upon completion of a molding operation and admission of a parison such as parison 40 in the space divided by parting plane 60. In the closed position, mating faces of mold components 12 and 22 abut at 60, and base component 50 engages an opening defined by the mating faces to close the end of the blow molding cavity. With the molds closed surrounding the parison, the parison is pressurized to expand the parison material to abut the molding surfaces of the cavity, and advantageously, mechanically stretched longitudinally by introduction of a stretch rod or the like through the parison mouth as is known.

Figure 3:
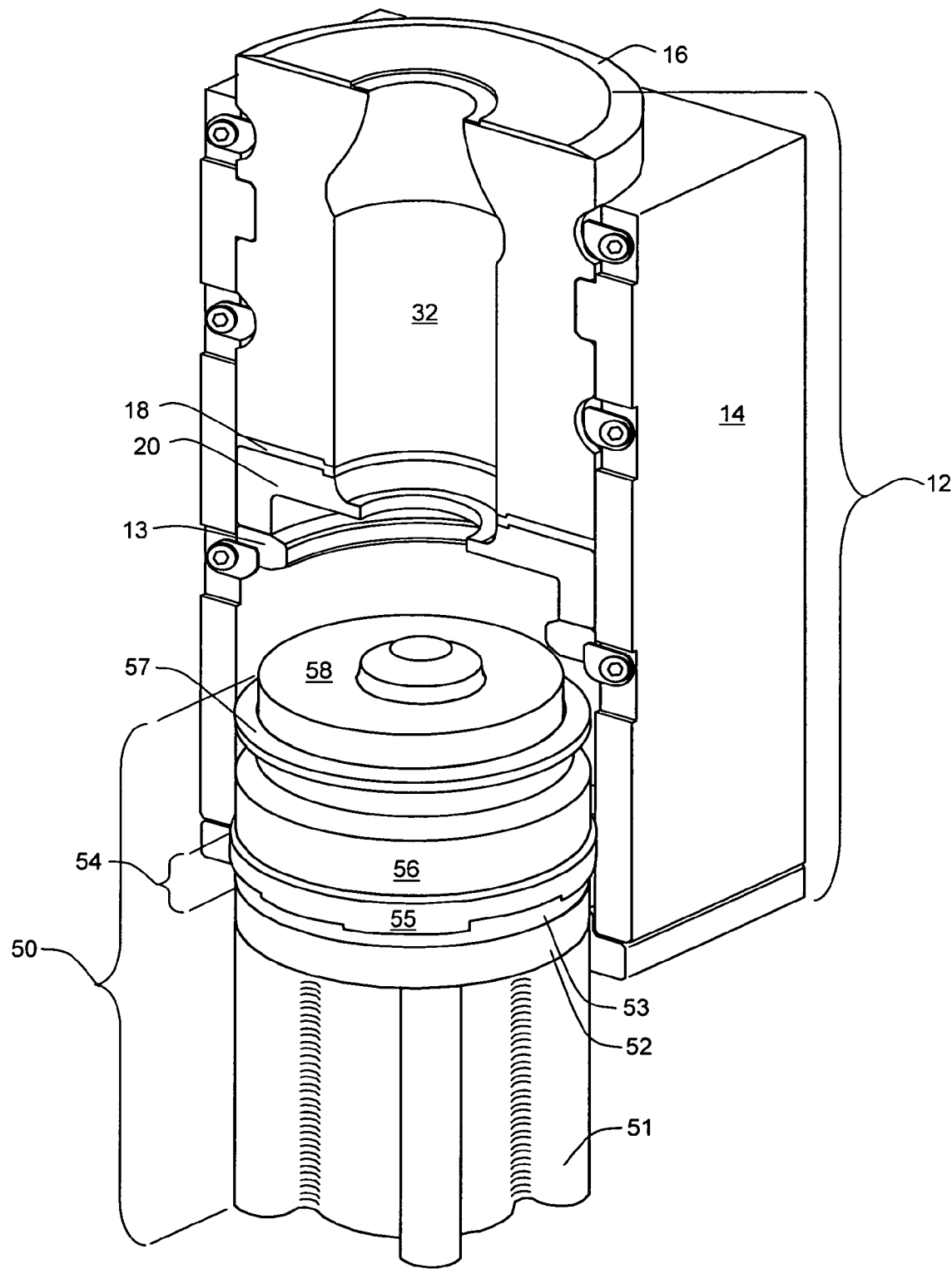
FIG. 3 is a three dimensional view of mold components of FIG. 2.

Referring to FIG. 3, mold component 12 comprises shell 14 supporting mold inserts 16 and 20 and height insert 18. Base mold component 50 comprises pedestal extension 51, upper pedestal plate 52, mold base height adjusting assembly 54, base plate 56, base locating plate 57, and base mold 58. Base mold 58 comprises molding surfaces defining a portion of container base 43 and mold inserts 16 and 20 together with height insert 18 comprise molding surfaces 32 of the cavity defining body 46 of the container to be blow molded. The periphery of base component 50 engages locating ridge plate 13 at the groove created by base plate 56 and base locating plate 57. As illustrated in FIG. 3, base mold component 50 is located in position prior to mating engagement of mold halves 12 and 22. Once a container 42 is conditioned for removal, mold halves 12 and 22 are separated and base mold component 50 is retracted to disengage base mold 58 from container base 43. Mold inserts 16 and 20 together with height insert 18 establish the longitudinal extent of the body of the container to be produced. With height insert 18 omitted, mold inserts 16 and 20 establish the longitudinal extent of the body of the container to be produced. Hence, longitudinal extent of the body of a container to be produced can range from a minimum established by longitudinal dimensions of mold inserts 16 and 20 to a maximum established by longitudinal dimensions of mold inserts 16 and 20 and of height insert 18. As base mold component 50 is reciprocated between a retracted position permitting removal of molded articles and an advanced position for engagement of base mold 58 with mold halves 12 and 22, it is necessary to adjust the overall length of base mold component 50 to accommodate the range of longitudinal extent of containers that can be produced using mold inserts 16 and 20 and height insert 18. The overall length of base mold component 50 is adjusted by height adjusting assembly 54.

Figure 4:
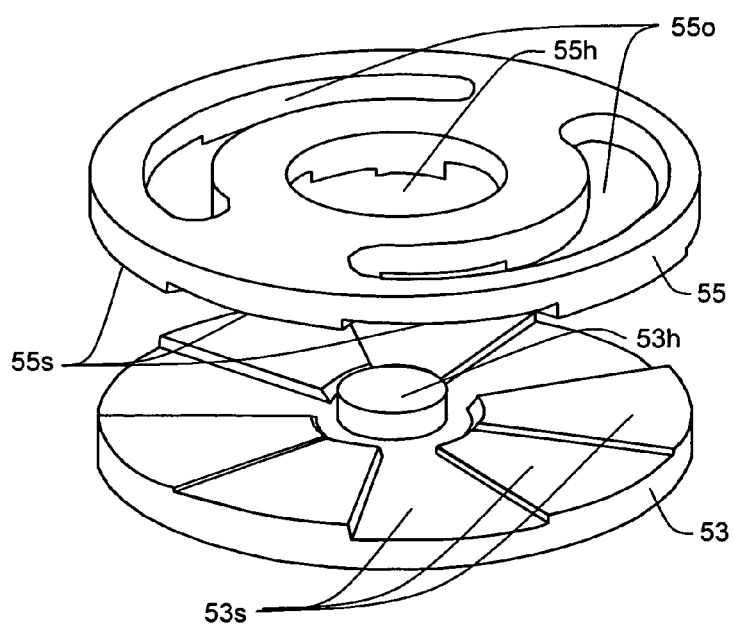
FIG. 4 is a three dimensional view of adjusting plates of the base height adjusting assembly of FIG. 3.

Referring to FIG. 4 adjusting plates of height adjusting assembly 54 are shown separated to reveal the top surfaces of both. Lower adjusting plate 53 comprises at least two stepped segments 53s, three sets of three steps 53s being shown in FIG. 4 arranged in the top surface of lower adjusting plate 53. Each of steps 53s has a planar face spaced a predetermined distance from the bottom of adjusting plate 53, the three steps 53s of each set being spaced closest, intermediately and farthest, respectively, from the bottom surface of adjusting plate 53. Lower adjusting plate 53 further comprises center hub 53h facilitating alignment of base plate 56 in base mold component 50. Upper adjusting plate 55 comprises at least two stepped segments 55s, the number and arrangement of steps 55s corresponding to the number and arrangement of steps 53s of lower adjusting plate 53. Each of steps 55s has a planar face spaced a predetermined distance from the top of upper adjusting plate 55, the three steps of one set being spaced closest, intermediately and farthest, respectively, from the top of adjusting plate 55 as seen in profile in FIG. 4. Upper adjusting plate 55 further comprises central hub opening 55h and arcuate clearance openings 55o which facilitate rotation of upper adjusting plate 55 relative to lower adjusting plate 53. Steps 53s and 55s are arranged so that abutting engagement of the faces thereof is determined by the angular orientation of upper adjusting plate 55 relative to lower adjusting plate 53. Minimum height of adjusting assembly 54 obtains when upper adjusting plate 55 is oriented to align steps 55s spaced farthest from the top thereof with steps 53s spaced closest to the bottom of lower adjusting plate 53. Maximum height of adjusting assembly 54 obtains when upper adjusting plate 55 is oriented to align steps 55 spaced farthest from the top thereof with steps 53s spaced farthest from the bottom of lower adjusting plate 53.

Figure 5A:
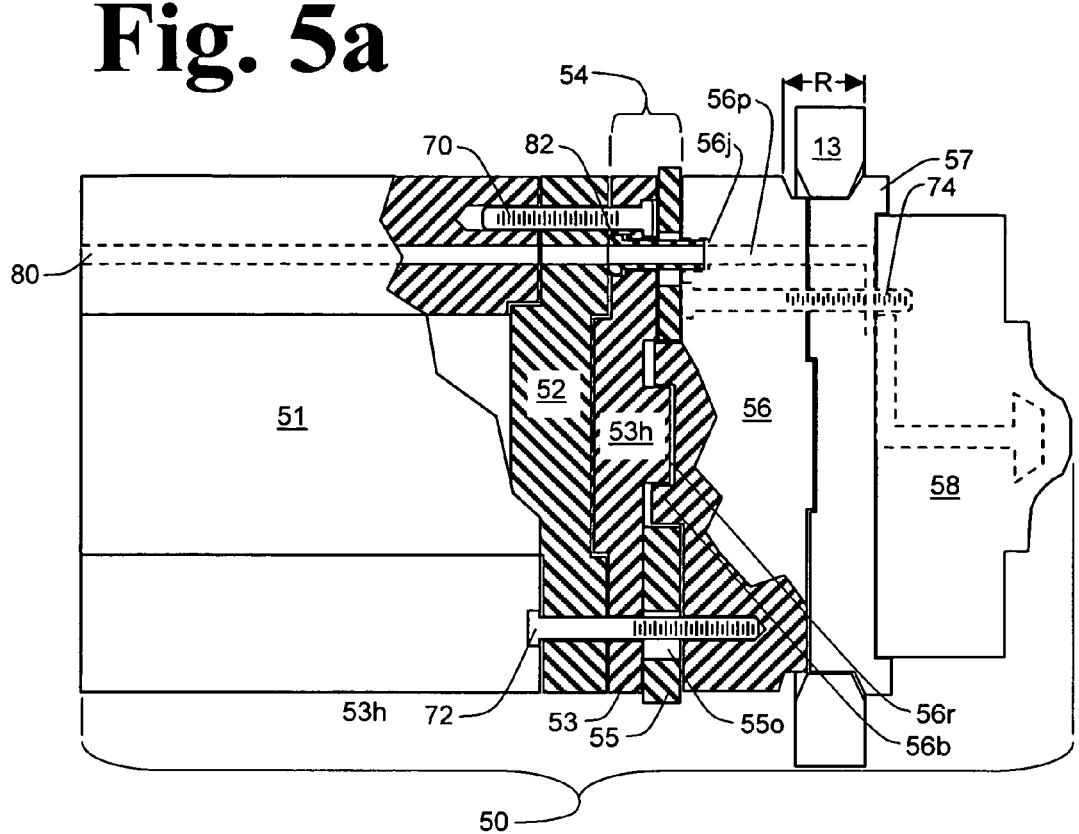
FIGS. 5a and 5b are partial sectional views of the base mold component of FIG. 3 shown with the height adjusting assembly set at extremes of its range.
Figure 5B:
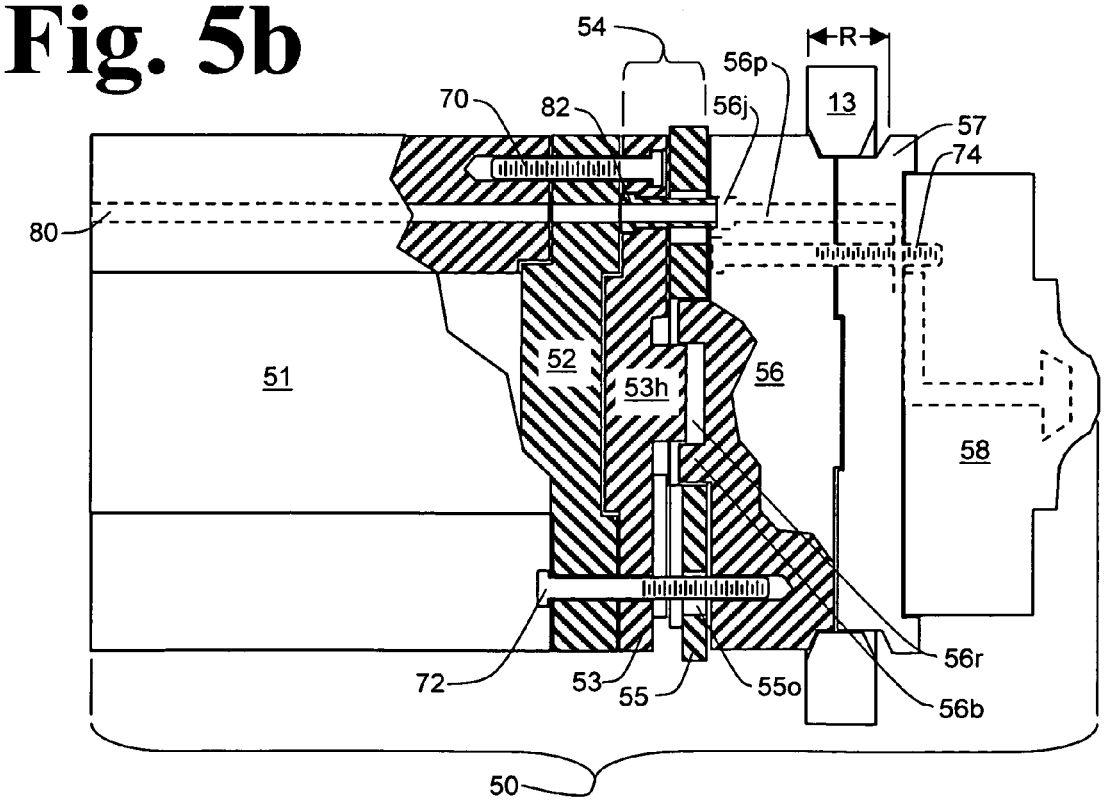

Referring to FIGS. 5a and 5b, mold base component 50 is shown with height adjusting assembly 54 set at the extremes of the range of adjustment "R" (shown relative to engagement of locating ring plate 13 with the groove created by base plate 56 and base locating plate 57). Pedestal plate 52 is fixed to pedestal extension 51 by fasteners, such as threaded fastener 70, passing through lower adjusting plate 53. Pedestal plate 52 is joined to base plate 56 by fasteners, such as fastener 72, passing through height adjusting assembly 54. Base plate 56 is joined to base mold 58 by fasteners, such as threaded fastener 74 (shown in phantom in FIGS. 5a and 5b) passing through locating ring plate 57. With base mold component fully assembled, upper and lower adjusting plates 53 and 55 are held in mating engagement by the attachment of base plate 56 to pedestal plate 52. Hub 53h of lower adjusting plate 53 is shown engaged with recess 56r of boss 56b of base plate 56 centered in and projecting into hub opening 55h, whereby base plate 56 is aligned with lower adjusting plate 53. The fasteners attaching base plate 56 to pedestal plate 52 are retracted to allow rotation of upper adjusting plate 55 and are advanced to hold upper adjusting plate 55 in the selected angular orientation relative to lower adjusting plate 53.

Continuing with reference to FIGS. 5a and 5b, threaded fastener 72 is shown passing through arcuate clearance opening 55o. Boss 56b of base plate 56 is shown engaged with hub opening 55h of upper adjusting plate 55. Height of adjusting assembly 54 is determined by the relative angular orientation of upper adjusting plate 55 and lower adjusting plate 53. To facilitate setting a desired relative angular orientation without disassembly of base mold component 50, upper adjusting plate 55 is rotatable around the central longitudinal axis of base mold component 50. Arcuate clearance openings 55o and hub opening 55h permit rotation of upper level adjusting plate with height adjusting assembly 54 retained in the assembled base mold component 50. Rotation is effected after retraction of fasteners, such as threaded fastener 72, attaching pedestal plate 52 to base plate 56. Upper adjusting plate 55 is slightly larger in diameter than lower adjusting plate 53 so that the periphery of upper adjusting plate 55 projects beyond the periphery of lower adjusting plate 53 to facilitate rotation by applying tangential force to the periphery of upper adjusting plate 55. A desired relative angular orientation of lower adjusting plate 53 and upper adjusting plate 55 is set by advance of the retracted fasteners clamping height adjusting assembly between pedestal plate 52 and base plate 56.

Referring to FIGS. 4, 5a and 5b and considering the configuration of steps 53s and 55s, angular orientations aligning particular ones of steps 53s with particular ones of steps 55s are determined by the number of steps. Hence, height is adjusted by angular indexing of upper adjusting plate 55 relative to lower adjusting plate 53 to achieve the desired alignment of steps 53s with steps 55s. Each angular index of upper adjusting plate 55 adjusts height of the adjusting assembly 54 by a predetermined increment determined by the heights of the particular ones of steps 53s and 55s which are brought into abutting engagement. Advantageously, index markings are applied to the perimeters of upper adjusting plate 55 and lower adjusting plate 53 to provide a visually perceptible indication of angular orientation to facilitate rotation of upper adjusting plate 55 to achieve a desired height of height adjusting assembly 54. As illustrated in FIG. 5a, minimum height of height adjusting assembly 54 is achieved when the faces of step 53s spaced closest to the bottom of lower adjusting plate 53 are abutted with the faces of steps 55s spaced farthest from the top of upper adjusting plate 55. With the arrangement of sets of steps 53s and 55s illustrated in FIG. 4, the angular orientation of upper adjusting plate 55 resulting in minimum height of adjusting assembly 54 occurs with abutting engagement of faces of all steps 53s with faces of all steps 55s. As illustrated in FIG. 5b, maximum height of height adjusting assembly 54 is achieved when the faces of steps 53s spaced farthest from the bottom of lower adjusting plate 53 are abutted with the faces of steps 55s spaced farthest from the top of upper adjusting plate 55. With the arrangement of sets of steps 53s and 55s illustrated in FIG. 4, the angular orientation of upper adjusting plate 55 resulting in maximum height of adjusting assembly 54 occurs with abutting engagement of faces of only those steps 53s and 55s. Intermediate height of adjusting assembly 54 is achieved with a relative angular orientation of upper adjusting plate 55 to achieve abutting engagement of the faces of steps 53s spaced intermediately from bottom of adjusting plate 53 with the faces of steps 55s spaced farthest from the top of upper adjusting plate 55. The increments of height of adjusting assembly 54 are determined by the incremental change of longitudinal extent effected by height inserts 18.

Referring to FIGS. 5a and 5b, base mold component 50 advantageously comprises passages therethrough for conducting fluids such as heat transfer fluids and compressed air. A fluid passage 80 is illustrated in pedestal extension 51 and in fluid communication with passages through plates 52, 53, 55, 56 and 57 (passages in plates 56 and 57 shown in phantom (dashed)). At the boundaries of plates 52, 56, and 57 seals (not shown) are provided to prevent leakage of fluids at the boundaries between the plates. To accommodate the range R of height adjusting means 54, hollow fitting 82 is inserted into lower adjusting plate 53 to pass through arcuate clearance passage 55o and into slip joint recess 56j of base plate 56. Seals (not shown) are provided at the abutment of fitting 82 and pedestal plate 52 to prevent leakage of fluid at the boundary therebetween. Fitting 82 conducts fluid conveyed through passage 80 through lower adjusting plate 53 and upper adjusting plate 55 to base plate 56. Slip joint recess 56j joins passage 56p through base plate 56 for conduction of fluid to base locating plate 57. Seals (not shown) are placed between fitting 82 and recess 56j to prevent leakage of fluid around fitting 82 within recess 56j. Fitting 82 is chosen to have sufficient length to span the maximum height of adjusting assembly 54 and extend into recess 56j. By virtue of passage through arcuate clearance opening 55o, fitting 82 provides for conduction of fluid through upper adjusting plate 55 irrespective of the angular orientation thereof. Heat transfer fluid is advantageously conducted through passages, such as passage 80 of base mold component 50 to the interior of base mold 58 and conducted therefrom out of base mold component 50 by like passages (not shown) to allow circulation of heat transfer fluid through the interior of base mold 58.

While the invention has been illustrated and described with reference to the preferred embodiment of the figures, it is not intended that the scope of the invention be defined by the preferred embodiments. In particular, it is contemplated that the number of steps 53s, and of corresponding steps 55s, may be any number two or greater according to the incremental adjustment of longitudinal extent of the container effected by inserts 18. Further, the increments of height adjustment achieved with each index of angular orientation of upper adjusting plate 55 may vary according to the height (thickness) of the selected height insert 18 rather than be uniform.

What is claimed is:

1. A mold assembly for blow molding comprising first, second and third mating mold components, the mating mold components comprising molding surfaces defining the exterior of an article to be molded from a tubular parison, the molding surfaces of the first and second mating mold components being open to mating faces thereof, the molding surfaces of the third mold component defining a portion of a closed end of the blow molded article, the mold assembly accepting at least one height insert selected according to a desired longitudinal extension of the molded article, and indexable adjusting means for altering the position of the molding surfaces of the third mold component to accommodate the effective longitudinal extension of the article to be molded.

2. The mold assembly according to claim 1 wherein the article to be molded comprises a neck portion and a base portion and the height insert comprises molding surfaces defining a segment between the neck portion and the base portion.

3. The mold assembly according to claim 1 wherein the indexable adjusting means comprises first and second plates each having an engaging face, each engaging face comprising plural planar stepped portions arranged for engagement with planar stepped portions of the engaging face of the other plate so that relative angular orientation of the first and second plates establishes the overall height of the plates as engaged.

4. The mold assembly according to claim 3 wherein the first and second plates are mounted in the third mold component with the engaging faces abutting, one of the first and second plates being mounted so as to be fixed in angular orientation relative to the third mold component and the other being mounted so as to permit rotation thereof relative to the third mold component while the third mold component remains assembled so as to alter the abutting engagement of planar stepped portions of the engaging faces.

5. The mold assembly according to claim 4 wherein the third mold component comprises members between which the adjusting means is mounted, the members being joined with fasteners for releasably clamping the first and second plates in a relative angular orientation.

6. The mold assembly according to claim 5 wherein the one of the first and second plates mounted so as to be rotatable in the assembled third mold component comprises arcuate slots through which the fasteners joining the members pass, the slots permitting rotation of the plate while the members remain joined by the fasteners.

7. The mold assembly according to claim 5 wherein one of the first and second plates comprises a hub, the other of the plates comprises a hub opening, and one of the members comprises a boss and recess centered at the hub opening, the boss engaging the hub opening and the recess engaging the hub as the adjusting means is mounted in the third mold component.

8. The mold assembly according to claim 4 wherein the third mold component comprises passages for conducting fluids therethrough and the adjusting means further comprises hollow fittings in fluid communication with the passages, the hollow fittings passing through arcuate slots in the one of the first and second plates mounted to be rotatable relative to the third mold component so as to permit rotation of said plate while maintaining fluid communication of the passages.

9. A blow molding machine comprising a press and a mold assembly, the mold assembly comprising mating mold components, each of the mold components being mounted to a movable member of the press for bringing the mating mold components into engagement for blow molding and for separating the mold components for removal of blow molded articles from the mold assembly, each of first and second mating mold components comprising molding surfaces open to a mating face of the mold component and defining the exterior of the body of an article to be molded from a tubular parison, molding surfaces of a third mold component defining a portion of a closed end of the blow molded article, the mold assembly accepting at least one height insert selected according to a desired longitudinal extension of the molded article, and indexable adjusting means for altering the position of the molding surfaces of the third mold component relative to a machine member supporting the third mold component, the adjusting means accommodating the effective longitudinal extension of the article to be molded.

10. The blow molding machine according to claim 9 wherein the article to be molded comprises a neck portion and a base portion and the height insert comprises molding surfaces defining a segment between the neck portion and the base portion.

11. The blow molding machine according to claim 9 wherein the indexable adjusting means comprises first and second plates each having an engaging face, each engaging face comprising plural planar stepped portions arranged for engagement with planar stepped portions of the engaging face of the other plate so that relative angular orientation of the first and second plates establishes the overall height of the plates as engaged.

12. The blow molding machine according to claim 11 wherein the first and second plates are mounted in the third mold component with the engaging faces abutting, one of the first and second plates being mounted so as to be fixed in angular orientation relative to the third mold component and the other being mounted so as to permit rotation thereof relative to the third mold component while the third mold component remains assembled so as to alter the abutting engagement of planar stepped portions of the engaging faces.

13. The blow molding machine according to claim 12 wherein the third mold component comprises members between which the adjusting means is mounted, the members being joined with fasteners for releasably clamping the first and second plates in a relative angular orientation.

14. The blow molding machine according to claim 13 wherein the one of the first and second plates mounted so as to be rotatable in the assembled third mold component comprises arcuate slots through which the fasteners joining the members pass, the slots permitting rotation of the plate while the members remain joined by the fasteners.

15. The blow molding machine according to claim 13 wherein one of the first and second plates comprises a hub, the other of the plates comprises a hub opening, and one of the members comprises a boss and recess centered at the hub opening, the boss engaging the hub opening and the recess engaging the hub as the adjusting means is mounted in the third mold component.

16. The blow molding machine according to claim 12 wherein the third mold component comprises passages for conducting fluids therethrough and the adjusting means further comprises hollow fittings in fluid communication with the passages, the hollow fittings passing through arcuate slots in the one of the first and second plates mounted to be rotatable relative to the third mold component so as to permit rotation of said plate while maintaining fluid communication of the passages.

* * * * *